United States Patent
Ricken

(10) Patent No.: US 10,816,377 B2
(45) Date of Patent: Oct. 27, 2020

(54) CORIOLIS MASS FLOW AND DENSITY METER WITH REDUCED PRESSURE DEPENDENCE

(71) Applicant: ROTA YOKOGAWA GMBH & CO. KG, Wehr (DE)

(72) Inventor: Martin Ricken, Bad Saeckingen (DE)

(73) Assignee: ROTA YOKOGAWA GMBH & CO. KG, Wehr (DE)

( * ) Notice: Subject to any disclaimer, the term of this patent is extended or adjusted under 35 U.S.C. 154(b) by 0 days.

(21) Appl. No.: 16/456,330

(22) Filed: Jun. 28, 2019

(65) Prior Publication Data
US 2020/0064170 A1    Feb. 27, 2020

(30) Foreign Application Priority Data
Jun. 29, 2018   (DE) ......................... 10 2018 005 197

(51) Int. Cl.
*G01F 1/84* (2006.01)
*G01F 15/14* (2006.01)

(52) U.S. Cl.
CPC .......... *G01F 1/8413* (2013.01); *G01F 1/8459* (2013.01); *G01F 15/14* (2013.01)

(58) Field of Classification Search
None
See application file for complete search history.

(56) References Cited

U.S. PATENT DOCUMENTS

| | | | | |
|---|---|---|---|---|
| 4,768,385 A * | 9/1988 | Cage | ..................... | G01F 1/8413 73/861.355 |
| 4,831,885 A * | 5/1989 | Dahlin | .................. | G01F 1/8409 138/30 |
| 6,308,580 B1 * | 10/2001 | Crisfield | ............... | G01F 1/8409 73/861.355 |
| 6,415,668 B1 * | 7/2002 | Cage | ..................... | G01F 1/8413 73/861.355 |
| 6,763,730 B1 * | 7/2004 | Wray | .................... | G01F 1/8404 73/861.355 |

(Continued)

FOREIGN PATENT DOCUMENTS

| | | |
|---|---|---|
| DE | 69401358 | 1/1997 |
| DE | 102006053899 | 5/2008 |

(Continued)

*Primary Examiner* — Harshad R Patel
(74) *Attorney, Agent, or Firm* — Grossman, Tucker, Perreault & Pfleger, PLLC

(57) ABSTRACT

A Coriolis mass flow meter, comprising a housing with an inlet and an outlet for a fluid medium, which are arranged along a flow axis, two measuring tubes configured to allow the fluid medium to flow through them in a flow direction and arranged between the inlet and the outlet and having a measuring tube circumference on their external surface, a fixing element which connects the two measuring tubes in the region of the inlet and/or the outlet in such a manner that they are fixed in position relative to one another, wherein the fixing element includes a first connecting member and a second connecting member connected to both measuring tubes, and wherein each of the connecting members rests against the measuring tubes in such a manner that a part of the measuring tube circumference of each measuring tube remains free.

7 Claims, 5 Drawing Sheets

(56) References Cited

U.S. PATENT DOCUMENTS

| | | | |
|---|---|---|---|
| 7,628,083 B2* | 12/2009 | Lanham | G01F 1/8409 73/861.355 |
| 2006/0162468 A1* | 7/2006 | Hussain | G01F 1/8413 73/861.357 |
| 2006/0283264 A1* | 12/2006 | Zangenberg | G01F 1/8409 73/861.355 |
| 2011/0247433 A1* | 10/2011 | Werbach | G01F 1/8477 73/861.357 |
| 2013/0283932 A1 | 10/2013 | Ricken et al. | |
| 2013/0291652 A1* | 11/2013 | Rieder | G01F 1/8404 73/861.357 |
| 2013/0319134 A1* | 12/2013 | Chatzikonstantinou | G01F 1/8477 73/861.355 |
| 2015/0033874 A1* | 2/2015 | Wang | G01F 1/8409 73/861.355 |
| 2015/0143922 A1* | 5/2015 | Luo | G01F 1/8418 73/861.355 |
| 2015/0323362 A1* | 11/2015 | Sun | G01F 1/8413 73/861.355 |
| 2019/0277682 A1* | 9/2019 | Ricken | G01F 1/8427 |

FOREIGN PATENT DOCUMENTS

| | | |
|---|---|---|
| DE | 102012016490 | 12/2013 |
| DE | 102018001778 | 9/2019 |
| EP | 0710352 | 1/1997 |
| EP | 2657659 | 10/2013 |

\* cited by examiner

CORIOLIS MASS FLOW AND DENSITY METER WITH REDUCED PRESSURE DEPENDENCE

FIELD

The invention relates to a Coriolis mass flow meter.

BACKGROUND

Generic Coriolis mass flow meters are known, for example, from EP 2 657 659 A1, DE 10 2012 016 490 A1 or DE 694 01 358 T2. They are employed in various industries to measure fluid mass flow and/or density. Known Coriolis mass flow meters comprise a housing with an inlet and an outlet for a substance to be measured, i.e., a fluid medium, said inlet and outlet being arranged along a flow axis. The flow axis corresponds, for example, to the flow direction in a straight tube section in which the Coriolis mass flow meter is interposed. Moreover, the Coriolis mass flow meter comprises at least one measuring tube configured to allow a substance to be measured to flow through it in a flow direction and arranged between the inlet and the outlet. The measuring tube may lead the substance to be measured from the inlet to the outlet via various paths, for example, the measuring tube may be arcuate, U-shaped or straight. In such configurations, the flow direction of the substance to be measured may deviate from the flow axis by up to 90°. The measuring tube itself is adapted to the respective application, for example, with a large diameter for large flow volumes. In this manner, the Coriolis mass flow meter is adapted to the fluid to be measured and the expected volumetric flow rates.

The measurement itself is then based on the Coriolis principle. For this, the Coriolis mass flow meter comprises a vibration exciter configured to cause vibration, preferably resonant vibration, of the measuring tube in a vibration direction. The exciter may be configured, for example, as an electromagnetic driving coil and a magnet. Moreover, two vibration sensors are provided for detection of the movements of the measuring tube, which are, for example, arranged on the measuring tube, preferably on different sides of the vibration exciter, spaced apart from each other along the flow direction of the measuring tube. Due to the vibration of the measuring tubes induced by the exciter, Coriolis forces act on the fluid flowing inside the measuring tube which lead to a phase shift of the vibration detected by the vibration sensors. Based on this phase shift, conclusions can be drawn regarding the mass flow of the fluid flowing through the measuring tube. The density of the substance to be measured can be derived from the frequency of the resonant vibration of the measuring tube. Coriolis mass flow meters are characterized by high precision and particularly flexible applications, which is why they are widely used and employed for measuring a large variety of fluids.

As explained, the mass flow and the density of the fluid medium are determined based on the measured vibration of the measuring tube. A change in the vibration characteristics, for example the stiffness of the measuring tube, in particular during operation, results in interfering influences. As is known, the stiffness of the measuring tubes increases with increasing internal pressure, i.e. with increasing pressure of the fluid to be measured. Accordingly, the values measured by the Coriolis mass flow meter change with the pressure of the fluid to be measured. It is already known to determine this pressure dependence by calculation, measure the pressure of the fluid, and consider and mathematically compensate the influence of the pressure on the measured values in the evaluation of the measurement. This is, however, disadvantageous in that, on the one hand, the pressure needs to be determined separately, and the evaluation of the measurement results is made complicated. This results in higher costs of the measuring point, and the involvement and installation of a pressure gauge lead to increased maintenance efforts and an increased number of potential error sources.

Moreover, German patent application no. 10 2018 001 778.9 by the same applicant describes a way to reduce the pressure dependence of the Coriolis mass flow meter by employing at least partially oval tubes. When the internal pressure in the measuring tubes increases, the cross-sectional shape of the measuring tubes changes. The longer axis of the oval cross section is oriented in the vibration direction. This means that the measuring tubes flatten in the vibration direction and expand perpendicular to the vibration direction. Due to this change in cross section, the stiffness of the tubes against vibration in the vibration direction decreases. The applicant utilizes this decrease in stiffness caused by the change in the tube cross section to at least partially compensate the increase in stiffness caused by the increased internal pressure in the measuring tubes.

Generic Coriolis mass flow meters typically use two measuring tubes. Moreover, they usually include at least one fixing element connecting the two measuring tubes in the region of the inlet and/or the outlet in such a manner that they are fixed in position relative to one another. The fixing element typically rests against the external surface of the measuring tubes in the direction of the measuring tube circumference. The measuring tubes are connected with each other through the fixing elements, so that opposite vibration of the measuring tubes is prevented at the point at which the fixing elements are attached. In addition, the fixing elements transfer bending forces from one tube to the other tube, so that they essentially compensate each other (tuning fork concept). In this configuration, the resting area of the fixing element on the respective measuring tube is smaller in the flow direction than in the direction of the measuring tube circumference. The fixing elements are usually referred to and configured as gusset plates, i.e. typically as thin pieces of laser-cut sheet metal that are slipped over the tubes and fixed by soldering. Depending on the exact arrangement of the gusset plates, they define the dimensions of the vibrating portion of the measuring tubes at their point of attachment. As is known, the maximum bending of the measuring tubes occurs in the immediate vicinity or in the region of the fixing elements. However, the cross-sectional shape of the measuring tubes is held in place by the fixing elements in this exact region, so that a change in the cross-sectional shape of the measuring tubes is hampered compared to those regions in which no fixing elements are provided. The balance between the decrease in stiffness caused by the change in the cross-sectional shape and the increase in stiffness created by the increased internal pressure as aspired by the applicant is therefore only partially achieved. DE 10 2006 053 899 A1 teaches connecting the measuring tubes with plates having a resting area on the respective measuring tube that is larger in the flow direction than in the direction of the measuring tube circumference. However, these plates are based on different structural concepts and are not fixing elements in the sense of the present invention.

SUMMARY

The object of the present invention is thus to reduce the pressure dependence of the measurement of the mass flow and/or the fluid density to be measured in a Coriolis mass flow meter. This is to be realized in such a manner that no additional measurements such as pressure measurements are required. This is to reduce the overall costs of the installation of the measurement point and associated maintenance efforts.

More specifically, the object is achieved in a generic Coriolis mass flow meter as mentioned above through a configuration in which the fixing element is connected to the two measuring tubes in such a manner that a part of the measuring tube circumference of each measuring tube remains free. The basic idea of the invention now is that the fixing element is configured such that it allows deformation of the measuring tubes, and in particular of the cross-sectional shapes of the measuring tubes. To this end, according to the invention, the fixing element does not rest against the measuring tube along the entire measuring tube circumference but spares at least a part of the measuring tube circumference. Overall, the fixing element does therefore not contact the measuring tubes along the entire measuring tube circumference. Compared to conventional fixing elements, a region is thus created in which the external surface of the measuring tube, i.e. the measuring tube circumference, is left free by the fixing element. In this manner, the measuring tube can freely deform in this region. More particularly, the cross-sectional shape of the measuring tube can change such that the measuring tube flattens in the vibration direction and therefore the stiffness against bending in the vibration direction decreases. Since the maximum bending of the measuring tube occurs in the region of the fixing element during the vibration, a decrease in stiffness against this vibration in the region of the fixing element has a particularly large impact. Due to the fact that the invention facilitates the change in the cross-sectional shape of the measuring tube in this exact region, an improved compensation of the increase in stiffness caused by the increased internal pressure through the decrease in stiffness caused by the change in the cross-sectional shape is achieved. Overall, this enables an advantageous reduction or even complete elimination of the pressure dependence of the Coriolis mass flow meter. It is obviously also possible to provide two or even more fixing elements according to the invention, for example a respective one or two in the region of the inlet and in the region of the outlet.

The flow direction is at the same time the direction in which the measuring tubes extend. It can therefore also be referred to as the axial direction of the measuring tubes. In the present context, the circumference of the measuring tubes designates the line on the external surface of the measuring tubes which extends in a plane perpendicular to the flow direction. The circumferential direction corresponds to the direction along this line. The fixing element according to the invention is in particular configured as a gusset plate. The fixing element, and consequently also the connecting members explained below, are thus configured as thin metal sheets. The thickness of the fixing elements and the connecting members, respectively, thus preferably ranges from 2 mm to 10 mm Depending on the application, thicknesses of 2 mm to 5 mm are particularly preferred. The thickness here essentially corresponds to the dimension in the flow direction. This means that the dimension of the fixing element, and in particular also the connecting members of the fixing element, mainly extends perpendicular to the flow direction. More particularly, the dimension of the fixing element perpendicular to the flow direction is larger than the dimension of the fixing element in the flow direction. According to the invention, the fixing element rests against the measuring tube circumference of the measuring tubes. This means that the surface area on the external surface of the measuring tubes against which the fixing element rests or to which it is attached extends in the circumferential direction of the measuring tubes. The contact area or resting area between the fixing element and the measuring tubes therefore essentially lies in a cross-sectional plane of the measuring tubes which is perpendicular to the flow direction. The contact area is, for example, arcuate. More particularly, the contact area or connection area between the fixing element and the measuring tubes has a maximum extension in the flow direction that does not exceed its dimension along the circumferential direction of the measuring tubes. Generally, however, its dimension in the flow direction is much smaller than in the circumferential direction. The contact area or connection area therefore preferably extends along the circumferential direction of the measuring tubes and not in the flow direction.

The smaller the resting area or connection area between the fixing element and the measuring tubes, the higher the degree of deformability of the measuring tubes in the region of the fixing element. In other words, the larger the portion of the measuring tube circumference left free in the region of the fixing element, the higher the degree of deformability. The size of the connection area is particularly preferably set such that the pressure dependence of both the measurement of the mass flow and the measurement of the density is minimized and in particular completely compensated. The size of the respective connection area between the fixing element and the measuring tubes to be selected in the individual case and for a particular application can, for example, be determined theoretically in advance by calculation using the finite element method (FEM). The measuring tubes, the fixing elements, the flow of the fluid to be measured and the vibration of the measuring tubes are then represented in a computer-based model that is used to calculate optimized configurations. The corresponding use of such models, in particular FEM, is known to the skilled person and is therefore not discussed in more detail. In many prior art configurations, the fixing element encloses the measuring tubes along their entire measuring tube circumference. In this manner, the measuring tube is fixed in position. A separate attachment of the measuring tube to the fixing element is therefore not necessary. If, however, the resting area or connection area between the measuring tube and the fixing element is reduced, means for attachment to the measuring tubes must be used to maintain the function of the fixing element. The fixing element is therefore preferably attached to the measuring tubes, in particular along the measuring tube circumference. Moreover, the fixing element is preferably attached to the measuring tubes along less than two thirds, more particularly along less than half, preferably along less than one third, more preferably along less than one fifth, and particularly preferably along less than one eighth of the measuring tube circumference. In a particularly preferred embodiment, the fixing element is attached to the measuring tubes essentially, and in particular exactly, along one fourth of the measuring tube circumference. The reduction of the contact area between the fixing element and the measuring tubes in conjunction with the attachment of the fixing element to the measuring tubes achieves the maximum degree of deformability of the measuring tubes in the region of the fixing elements and at the same time a reliable fixation of the position of the two measuring tubeS relative to one another. What is important here is that, instead of the maximum deformability of the measuring tubes at the position of the fixing element, an optimized deformation is aspired which minimizes the pressure impact on the resonance frequency. The contact area between the fixing element and the measuring tube is thus set such that the deformation of the measuring tube is guided by the fixing element. The contact area is preferably configured such that the resulting deformation of the measuring tube compensates the deformation from the normal dimension such that a negative total expansion in the vibration direction results. This leads to a desired ovalization of the measuring tubes.

Generally, the fixing element could be configured as one integral piece. The fixing element thus forms a kind of frame through which the two measuring tubes extend. Yet, to achieve the deformability of the measuring tubes, the fixing element does not rest against the measuring tubes along the entire measuring tube circumference. According to the invention, however, the fixing element comprises a first connecting member and a second connecting member which are configured as separate components. Each connecting member is in this case connected to the external surface of both measuring tubes and all in all connects the two measuring tubes such that they are fixed in position relative to one another. In other words, the fixing element has a two-part configuration. The two connecting members are not contiguous and can be arranged on the measuring tubes independently. The first connecting member and the second connecting member are arranged on the measuring tubes at a distance from one another. Each connecting member is in this case connected to both measuring tubes, in particular such that bending forces can be transferred from one measuring tube to the other measuring tube. Moreover, the connecting members are in particular complementary in such a manner that they are arranged on opposite sides of the measuring tubes. In this manner, even two connecting members arranged separately from one another can achieve a particularly secure fixation of the measuring tubes.

The prior art fixing elements are typically arranged in a plane perpendicular to the flow direction. This plane thus comprises an orthogonal tube cross section. The fixing element according to the invention could likewise be arranged in a plane that comprises an orthogonal tube cross section. In this case, both connecting members would be arranged in the corresponding plane perpendicular to the flow direction. According to the invention, however, the connecting members are spaced apart from one another with respect to the flow direction. For example, the second connecting member is arranged offset relative to the first connecting member in the flow direction. With respect to the connection points between the second connecting member and the measuring tubes, the connection points between the first connecting member and the measuring tubes may thus be arranged in a plane that does not extend perpendicular to the flow direction. The corresponding connection points may, for example, be arranged in a plane that is angled relative to a plane perpendicular to the flow direction. This angled plane preferably extends essentially parallel to the vibration direction. Such an arrangement, in particular within the curves in the region of the inlet and/or the region of the outlet, leads to an improved vibration compensation and thus to a possible reduction of the thickness of the flow splitter or the bridge, which can reduce the overall manufacturing costs of the Coriolis mass flow meter. Moreover, the sensitivity of the device to external restraining forces is reduced. The optimum arrangement of the connecting members can likewise be ascertained using FEM.

The measuring tubes of a Coriolis mass flow meter are typically arranged next to each other in the vibration direction. This means that the fixing element must also transfer the bending forces of one tube, in particular in the vibration direction, to the other tube. In particular in the vibration direction, the connecting members therefore need to be configured such that they fix the measuring tubes in their position relative to one another in the vibration direction. A change of their cross-sectional shapes caused by an increased internal pressure, however, at the same time also changes the dimension of the measuring tubes in a direction perpendicular to both the flow direction and the vibration direction. The measuring tubes in fact widen in said direction. To permit this movement of the measuring tubes, which accompanies the deformation desired according to the invention, as much as possible, the connecting members are advantageously movable in this direction. In the case of a change in the cross-sectional shape of the measuring tube which leads to an expansion in this direction, the connecting member or connecting members can then be pushed aside or pulled along by the deforming measuring tube. The mobility requirement for the connecting members thus merely means that they have a play the magnitude of which is far below the radius of the measuring tubes. The connecting members are thus spaced apart from the housing by at least said play. All in all, the connecting members are preferably configured and arranged so as to be movable relative to the housing in a direction perpendicular to both the vibration direction and the flow direction. In this manner, the connecting members accommodate an expansion or a contraction of the measuring tubes in this direction during the deformation caused by varying internal pressure. The invention is thus particularly effective in this case. According to a particularly preferred configuration, the connecting members are spaced apart from the housing of the Coriolis mass flow meter by more than just said play. In this manner, it is ensured that neither vibration nor the deformation of the measuring tubes will cause the connecting members to contact the housing. This advantageously prevents vibration or oscillation of the measuring tubes from being transferred to the housing. In the flow direction, on the other hand, all connecting members are immobile.

The connecting members may generally be arranged at various positions on the measuring tube. In a preferred configuration, at least one of the connecting members is arranged in the region of curves of the measuring tubes located downstream of the inlet and/or upstream of the outlet in the flow direction. More particularly, both connecting members of a respective fixing element are arranged in one of the curves. Alternatively, the first connecting member may, for example, be arranged in the curve at the inlet while the second connecting member is arranged at the leg of the measuring tube adjoining the curve at the inlet. The first connecting member may also be arranged at the leg of the measuring tube upstream of the curve at the outlet while the second connecting member is arranged in the curve at the outlet. These configurations may also be combined. The respective configuration allows for the vibration characteristics of different tube geometries.

As already explained above, all tube shapes experience a change in the cross-sectional shape that occurs at the position of the fixing elements due to the increased internal pressure. This in particular decreases the stiffness of the measuring tubes against a vibration in the vibration direction. To utilize this effect as precisely as possible to compensate the increase in stiffness caused by the increased internal pressure, the tube shape may be adapted to this process already by its design. For example, the stiffness against vibration in the vibration direction may be increased by using tubes having an oval cross section, in particular with the longer axis of said oval cross section oriented in the vibration direction. The decrease in stiffness is particularly high in tubes shaped in this manner and can therefore be utilized particularly efficiently to compensate the increase in stiffness caused by an increased internal pressure. It is therefore preferred that at least one of the measuring tubes includes at least a section having an oval cross section, so that the measuring tube has a longer axis and a shorter axis perpendicular to the flow direction in this section. The longer axis is in particular oriented in the vibration direction. The details of this approach are described in applicant's German patent application no. 10 2018 001 778.9, which is incorporated herein by reference. In a particularly preferred configuration, both measuring tubes include at least a section having an oval cross section.

The at least one section having an oval cross section is advantageously arranged in the region of the fixing element. Moreover, the connecting members are preferably attached to the measuring tube in the section having an oval cross section. In this manner, both the sections having an oval cross section and the fixing elements are located in the region in which the measuring tube experiences the maximum bending. The effect of the invention can thus be utilized to a maximum degree and the pressure dependence of the Coriolis mass flow meter is greatly reduced or even completely avoided.

Generally, various attachment techniques may be employed to attach the fixing element to the measuring tubes. In preferred configurations, the fixing element is attached to the measuring tubes through soldering, welding or bonding. Soldered connections are particularly preferred. The corresponding attachments are reliable and can be obtained in a cost-effective manner.

BRIEF DESCRIPTION OF THE DRAWINGS

The invention will be explained in more detail below by reference to the embodiment examples shown in the figures. In the schematic figures.

DETAILED DESCRIPTION

Figure 1:
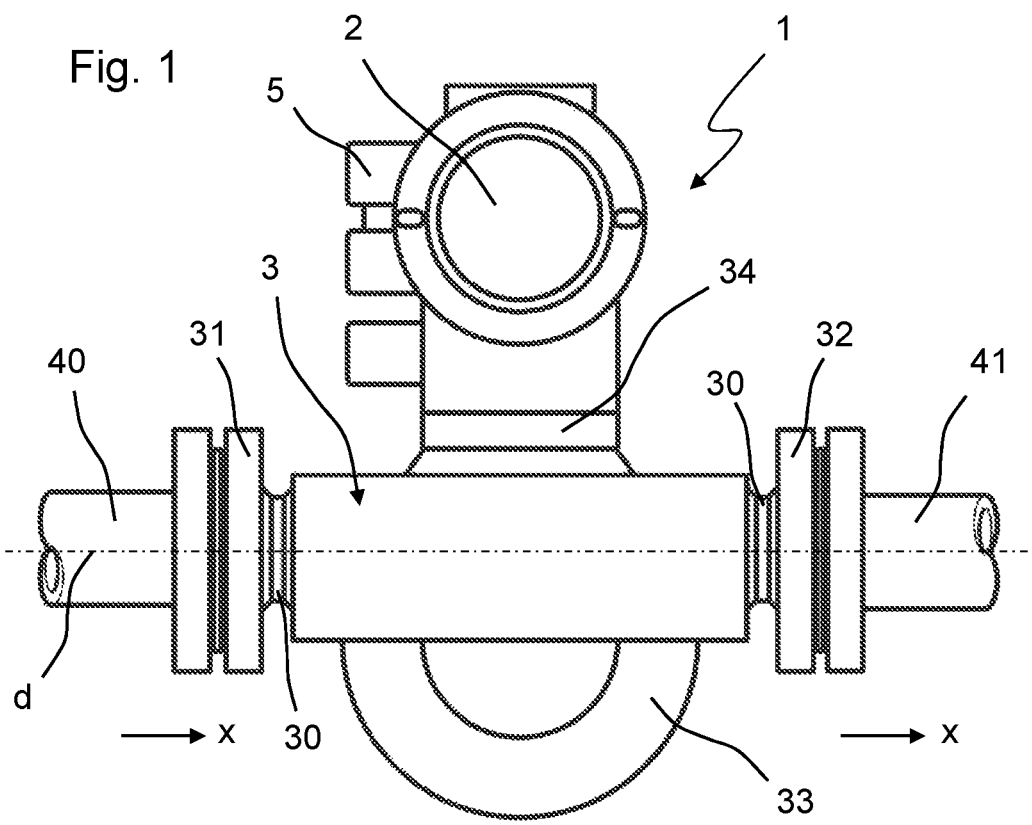
FIG. 1: is a side view of a Coriolis mass flow meter.

Like parts, or parts acting in a like manner, are designated by like reference numerals. Recurring parts are not designated separately in each figure.

FIG. 1 shows a Coriolis mass flow meter 1 with a transmitter 2 and a housing 3. The transmitter 2 of the Coriolis mass flow meter 1 accommodates the electronics inter alia for the vibration exciter and the vibration sensors, as well as a controller 5. It is connected to the housing 3 via a neck 34. During operation, the Coriolis mass flow meter 1 with its housing 3 is fitted into a pipeline transporting the fluid to be measured. More particularly, the Coriolis mass flow meter 1 includes connectors 30, which in turn include an inlet 31 for connection to a supply line 40 and an outlet 32 for connection to a discharge line 41 of the pipeline. The pipeline into which the Coriolis mass flow meter 1 is fitted defines the flow axis d. The flow axis d designates the direction in which the fluid would flow in the pipeline if it was not led through the Coriolis mass flow meter 1.

Figure 2:
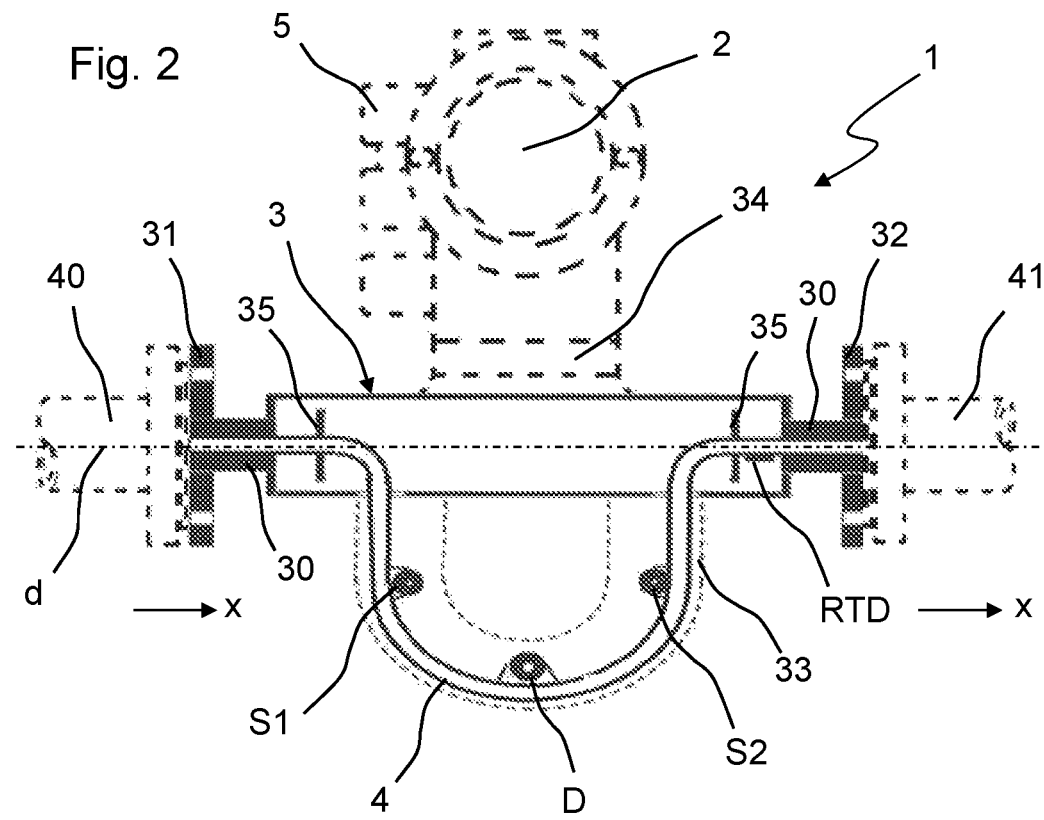
FIG. 2: shows the measuring tube inside the housing of the Coriolis mass flow meter according to FIG. 1.

Moreover, the Coriolis mass flow meter 1 includes a tube housing 33 in which two measuring tubes 4 are accommodated, as depicted in FIG. 2. FIG. 2 also shows the progression of the measuring tubes 4 through the housing 3 from the inlet 31 via the tube housing 33 to the outlet 32. The progression of the measuring tubes 4, which is U-shaped in the example shown, also defines the flow direction x of the fluid inside the measuring tube 4 and thus inside the Coriolis mass flow meter 1. The measuring tubes 4 are fixed by a respective fixing element 35 in both the region of the inlet 31 and the region of the outlet 32, said fixing element being configured as a gusset plate in the present example. As can also be seen from FIG. 2, a vibration exciter D is arranged on the measuring tube 4, which in operation of the Coriolis mass flow meter 1 is employed to cause vibration, particularly resonant vibration, of the measuring tubes 4. In FIG. 2, the vibration excited by the vibration exciter D is directed into and out of the paper plane, respectively. A first vibration sensor S1 and a second vibration sensor S2 are arranged on the measuring tubes 4 in the flow direction x upstream and downstream of the vibration exciter D, respectively. The vibration sensors S1, S2 detect the movements of the measuring tubes 4 and particularly the vibration induced by the vibration exciter D. Moreover, a temperature sensor RTD is arranged on the measuring tubes 4, which is, for example, configured as a resistance thermometer.

Figure 3:
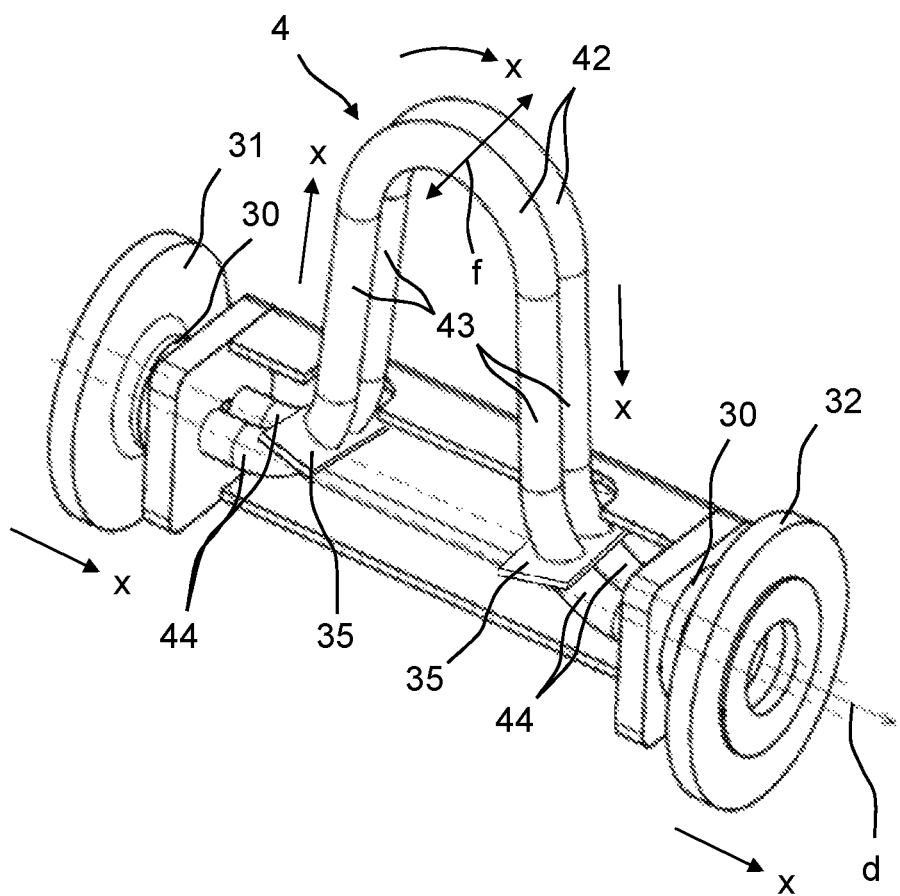
FIG. 3: shows the arrangement of two measuring tubes inside the housing of a Coriolis mass flow meter.

FIG. 3 illustrates the spatial arrangement of the two parallel measuring tubes 4. The measuring tubes 4 are respectively connected to the inlet 31 and the outlet 32. In these regions, they are respectively attached to each other via a fixing element 35, which is in this case configured as a gusset plate, such that their position relative to each other is fixed. In the example shown, the measuring tubes 4 have an essentially U-shaped progression, which also corresponds to the flow direction x of the fluid flowing through the measuring tubes 4. More particularly, each of the measuring tubes 4 includes two curves 44, two legs 43 and a curve segment 42 connecting the legs 43. The curves 44 here designate those sections of the measuring tubes 4 in which the fluid is led into and out of the U-shaped bulge, respectively. In the curves 44 and the curve segment 42, the flow direction x deviates from the flow axis d to a particularly small and more particularly a minimum extent. The legs 43 designate those sections of the measuring tubes 4 in which the flow direction x deviates from the flow axis d to a particularly large and more particularly a maximum extent. The curve segment 42 in turn describes the arcuate connection of the U-shaped bulge between the two legs 43. The vibration direction f is also indicated in FIG. 3. The vibration direction f results from the fact that the vector of the angular velocity of the vibration induced by the vibration exciter D is parallel to the flow axis d.

Figure 4:
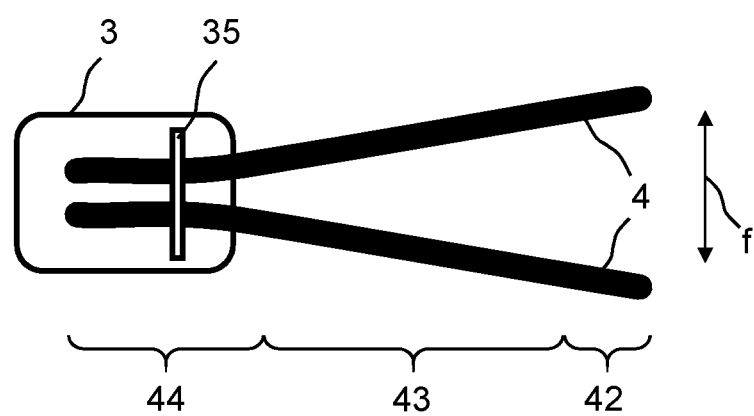
FIG. 4: shows the arrangement of a fixing element and the bending conditions at the measuring tubes of a Coriolis mass flow meter.

FIG. 4 illustrates the measuring tubes 4 in a view in the direction of the flow axis d. The viewing direction thus lies in the plane of the U-shaped progression of the measuring tubes 4. The two curves 44 and the two legs 43 of the measuring tubes 4 are therefore aligned, so that they cannot be distinguished. However, the respective sections of the curves 44, the legs 43 and the curve segment 42 of the measuring tubes 4 are also indicated. FIG. 4 serves to illustrate the bending conditions at the measuring tubes 4 and shows a point in time during operation of the Coriolis mass flow meter 1 when the two measuring tubes 4 have moved away from one another during the vibration excited by the vibration exciter D. The vibration amplitude is in this case exaggerated for reasons of illustration. As can be taken from this figure, the legs 43 and the curve segment 42 of the measuring tubes 4 are essentially not bent while the maximum bending of the measuring tubes 4 occurs in the region of the curves 44 and in particular in the immediate vicinity of the fixing element 35. In the embodiment example of FIG. 4, the fixing element 35 is, compared to that of FIG. 3, offset farther from the inlet 31 and the outlet 32, respectively, towards the legs 43 of the measuring tubes 4. It fixes the measuring tubes 4 in their position relative to one another and is spaced apart from the housing 3 to avoid a transfer of vibration to the housing 3.

Figure 5:
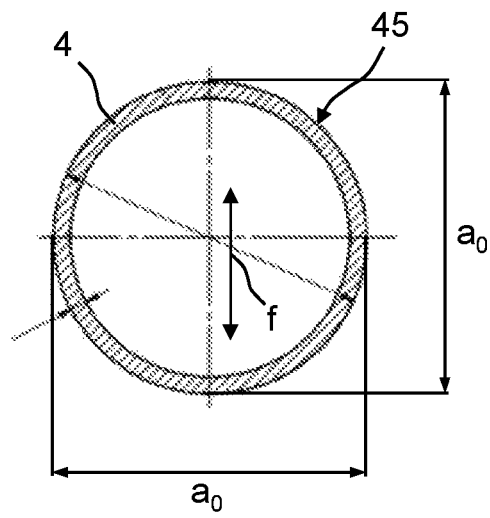
FIG. 5: is a cross-sectional view of a circular measuring tube.
Figure 6:
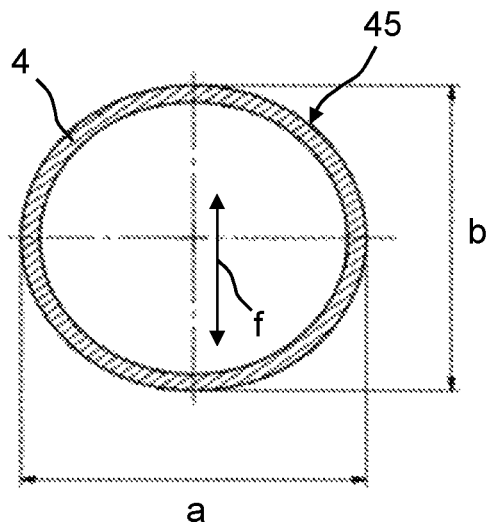
FIG. 6: is a cross-sectional view of the measuring tube according to FIG. 5 at increased internal pressure using a fixing element according to the invention.

FIGS. 5 to 8 illustrate various tube geometries, i.e. cross-sectional shapes of the measuring tubes 4, in their normal state and at increased internal pressure at the position of the fixing element 35. For example, FIG. 5 shows a measuring tube 4 having a circular tube cross section. This means that the diameter $a_0$ of the measuring tube 4 is essentially the same in and perpendicular to the vibration direction f but for manufacturing tolerances. FIG. 6 shows the measuring tube 4 according to FIG. 5 at increased internal pressure during operation of the Coriolis mass flow meter 1 with a fixing element 35 according to the invention at the position of the fixing element 35. At increased internal pressure, initially circular tubes will normally expand uniformly. Through the use of a fixing element 35 that spares a part of the measuring tube circumference 45, however, an ovalization or flattening of the tube cross section can be achieved. The fixing element 35 according to the invention thus induces a change in the cross-sectional shape of the initially circular measuring tubes 4 and at the same time controls the direction of the flattening. As shown in FIG. 6, the measuring tube 4 has flattened in the vibration direction f. It thus now has an oval cross section, i.e. an oval cross-sectional shape. The latter is characterized by a longer axis a and a shorter axis b with respect to the diameter of the measuring tube 4. As a result of the flattening of the measuring tube 4 during operation of the Coriolis mass flow meter 1, the diameter of the tube cross section decreases in the vibration direction f and increases perpendicular to the vibration direction f, so that a cross section with a longer axis a and a shorter axis b is created in the initially circular tube with uniform diameter $a_0$. Due to this deformation, i.e. due to this change in the cross-sectional shape of the measuring tube 4, the stiffness of the measuring tube 4 against vibration in the vibration direction f decreases. This effect is superimposed by the increase in stiffness that usually occurs due to the increased internal pressure.

Figure 7:
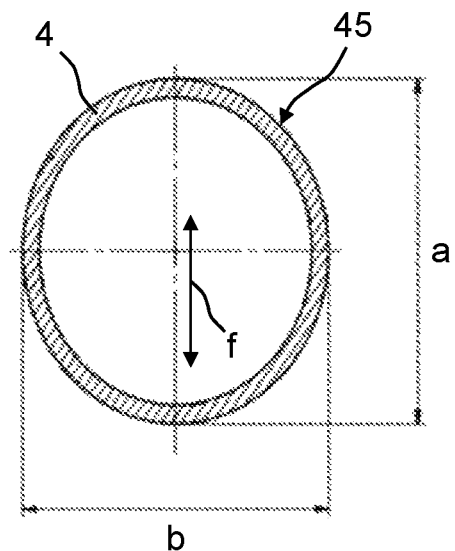
FIG. 7: is a cross-sectional view of an oval measuring tube.
Figure 8:
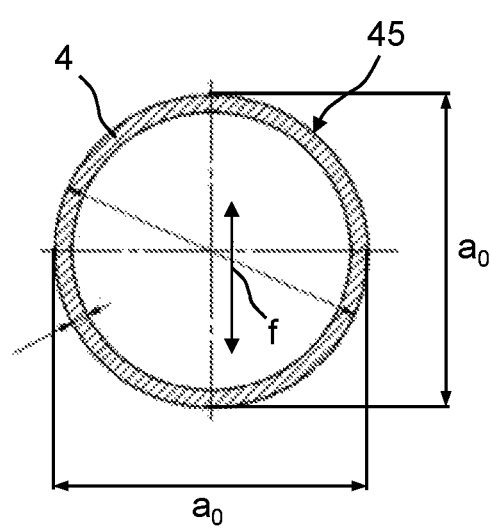
FIG. 8: is a cross-sectional view of the measuring tube according to FIG. 7 at increased internal pressure.

This effect also occurs in an initially oval measuring tube 4, as shown in FIGS. 7 and 8. The effect is in this case even increased since an oval tube, unlike an initially circular tube, already flattens due to the increased internal pressure. FIG. 7 shows a measuring tube 4 having an oval cross-sectional shape in the normal state. To increase the stiffness of the measuring tube 4 against vibration in the vibration direction f, the measuring tube 4 is arranged such that the longer axis a of the oval cross section is oriented in or parallel to the vibration direction f. In this manner, the oval measuring tube 4 according to FIG. 7 has a higher stiffness against vibration in the vibration direction f than, for example, the circular measuring tube 4 of FIG. 5. During operation of the Coriolis mass flow meter 1, i.e. in the case of an increased internal pressure and vibration in the vibration direction f, this tube likewise flattens, as illustrated in FIG. 8. Since the measuring tube 4 temporarily approximates a tube with a circular cross section during flattening, this process is also referred to as a rounding of the oval measuring tube 4. FIG. 8 shows a situation in which the oval measuring tube 4 of FIG. 7 has essentially approximated the circular tube shape according to FIG. 5 with uniform diameter $a_0$. In the case of a further increase in internal pressure, a further flattening according to the illustrations in FIG. 5 and FIG. 6 could be achieved through the use of a fixing element 35 according to the invention. Therefore, the total decrease in stiffness against vibrations in the vibration direction f that can be achieved in measuring tubes 4 having an oval cross section according to FIG. 7 is larger than in a tube having a circular cross-section according to FIG. 5, provided a fixing element 35 according to the invention is used. This increased effect can then also be used in a targeted manner to compensate the general increase in stiffness of the measuring tube 4 caused by the increased internal pressure.

All measuring tubes 4 have a measuring tube circumference 45 along their external surface. The measuring tube circumference 45 designates in particular the circular or oval line which, in a cross section through the measuring tube 4 perpendicular to the flow direction x, extends through the external surface of the measuring tube 4. The circumferential direction of the measuring tube 4 describes the direction that follows this circular or oval line on the external surface of the measuring tubes 4.

Figure 9:
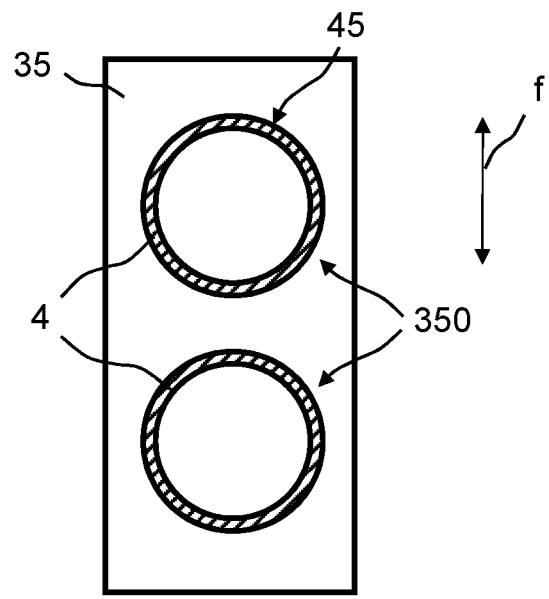
FIG. 9: shows the arrangement of a prior art fixing element on the measuring tubes.

FIGS. 9 to 13 respectively show different configurations of fixing elements 35 on the two measuring tubes 4. The embodiment according to FIG. 9 illustrates a prior art fixing element 35. The fixing element 35 is a gusset plate which includes two tube openings 350 through which the measuring tubes 4 pass through the fixing element 35. In this configuration, the measuring tubes 4 are enclosed by the fixing element 35 along their entire measuring tube circumference 45. More particularly, the fixing element 35 or gusset plate rests against the measuring tubes 4 along the entire measuring tube circumference 45. Through this, the tube geometry, i.e. in particular the cross-sectional shape, of the measuring tubes 4 is determined or stabilized by the fixing element 35.

Figures 10, 11:
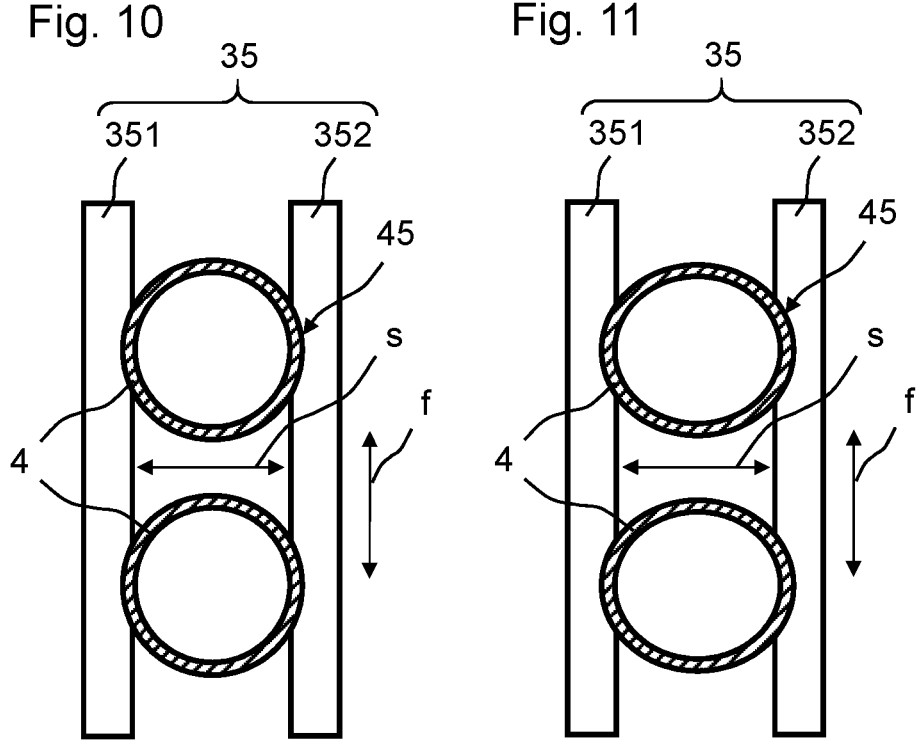
FIG. 10: shows the arrangement of a fixing element on circular measuring tubes according to FIG. 5.
FIG. 11: shows the fixing element and the measuring tubes according to FIG. 10 at increased internal pressure.
Figure 12:
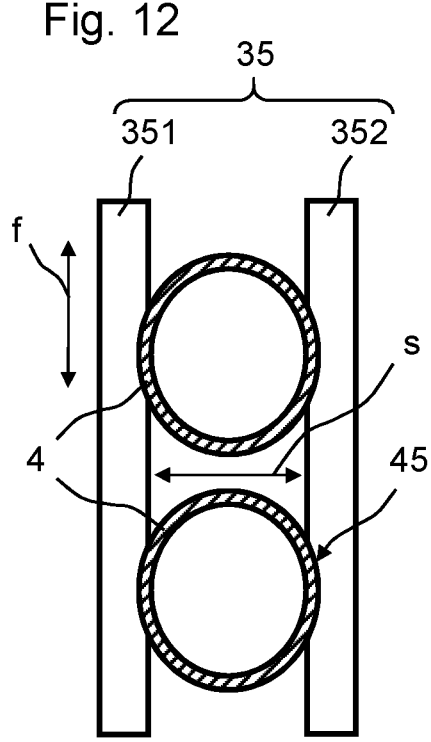
FIG. 12: shows the arrangement of a fixing element on oval measuring tubes according to FIG. 7.
Figure 13:
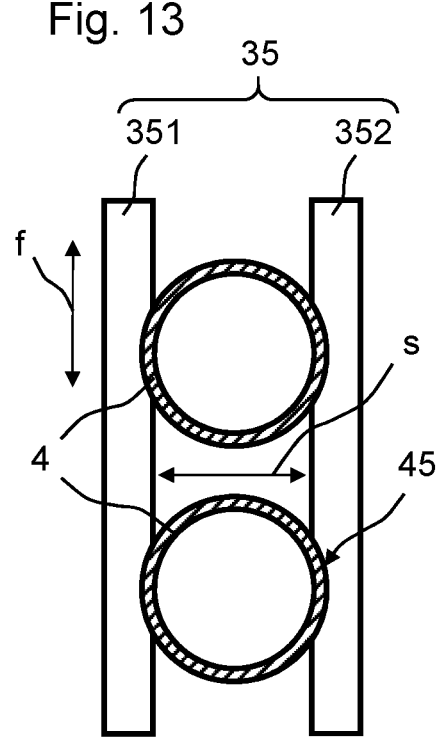
FIG. 13: shows the fixing element and the measuring tubes according to FIG. 12 at increased internal pressure.

FIGS. 10 to 13 illustrate the configuration of fixing elements 35 according to the invention on the measuring tubes 4. The fixing elements 35 include a first connecting member 351 and a second connecting member 352. The connecting members 351, 352 are configured as separate components that are only indirectly connected to each other via the measuring tubes 4. Each of the connecting members 351, 352 is connected to both measuring tubes 4 and in particular attached to them, preferably soldered to them. In FIGS. 10 and 12, the measuring tubes 4 are respectively illustrated in the normal state, FIG. 10 showing measuring tubes 4 having a circular cross section according to FIG. 5, and FIG. 12 showing measuring tubes 4 having an oval cross section according to FIG. 7. FIGS. 11 and 13 show the corresponding configurations during operation of the Coriolis mass flow meter 1 at increased internal pressure. As can be taken from the figures, this has led to a flattening of the measuring tubes 4 as already described above. Since the connecting members 351, 352 of the fixing element 35 spare, for example, a major part of the measuring tube circumference 45, i.e. are attached to only a part of the measuring tube circumference 45, the measuring tubes 4 can undergo the corresponding deformation, i.e. the change in their cross-sectional shape, during the flattening. The connecting members 351, 352 of the fixing element 35 guide this flattening, so that the desired deformation of the measuring tubes 4 is obtained. Such a guidance, or even deformation, does not occur with prior art fixing elements 35 which enclose the complete measuring tube circumference 45. The smaller the portion of the measuring tube circumference 45 to which the connecting members 351, 352 are attached, the easier the deformation of the cross section of the measuring tubes 4, said portion of the measuring tube circumference 45 being selected according to optimum deformation. The best configuration of the connection area must be determined for the respective application, for example by using FEM. This applies to the dimension of the connection area, for example the soldering area, both in the circumferential direction of the measuring tube 4 and in the flow direction x. Since the fixing elements 35, i.e. the connecting members 351, 352 according to FIGS. 10 to 13, are likewise configured as gusset plates, the connection between the connecting members 351, 352 and the measuring tubes 4 extends essentially only in the circumferential direction of the measuring tubes 4 and not in the flow direction x. More particularly, the maximum extension in the flow direction x of the connection areas between the connecting members 351, 352 and the measuring tubes 4 to which they are attached does not exceed their extension in the circumferential direction of the measuring tubes 4.

As can be seen from a comparison of FIGS. 10 and 11 and FIGS. 12 and 13, respectively, the dimension of the measuring tubes 4 perpendicular to the vibration direction f increases during the flattening. When the flattening decreases, the dimension of the measuring tubes 4 perpendicular to the vibration direction f also decreases. To also permit this movement of the measuring tubes 4 during the deformation or flattening as far as possible, the connecting members 351, 352 are movable in a direction perpendicular to both the flow direction x (which extends into and out of the paper plane, respectively, in FIGS. 10 to 13) and the vibration direction f. This direction is indicated as the direction of movement s in the figures. The connecting members 351, 352 are thus spaced apart from the housing 3 of the Coriolis mass flow meter 1, so that they can move freely in the direction of movement s. In the case of an increase in the dimension of the measuring tubes 4 in the direction of movement s during the flattening, the connecting members 351, 352 are thus pushed apart by the measuring tubes 4. In the case of a decrease in the dimension of the measuring tubes 4 in the direction of movement s during a decrease of the flattening, the connecting members 351, 352 are pulled together by the measuring tubes 4. In this manner, the deformation of the measuring tubes 4, i.e. their flattening, and therefore the change in their cross-sectional shape and stiffness against vibration in the vibration direction f, is facilitated further by the connecting members 351, 352. In this manner, it is ensured that, on the one hand, bending forces are reliably transferred from one measuring tube 4 to the other measuring tube 4 and the measuring tubes 4 do not perform undesired vibration in the region of the connecting members 351, 352, and, on the other hand, no vibration or oscillation is transferred to the housing 3.

Figure 14:
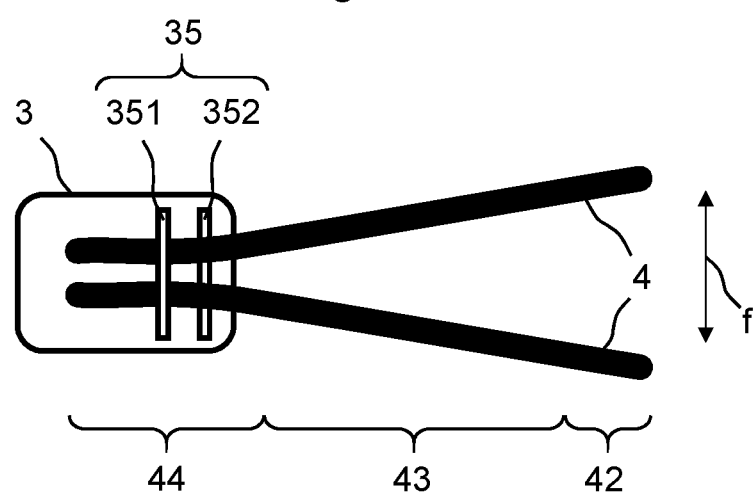
FIG. 14: shows the arrangement of two connecting members of a fixing element that are offset in the flow direction, and the bending conditions at the measuring tubes of a Coriolis mass flow meter.

FIG. 14 shows a view which corresponds to that of FIG. 4. However, in contrast to the fixing element 35 shown in FIG. 4, which is arranged at a single level in the flow direction x, the two connecting members 351, 352 of the fixing element 35 according to FIG. 14 are arranged on the measuring tubes 4 offset relative to one another in the flow direction x. More particularly, the first connecting member 351 is arranged upstream of the second connecting member 352 in the flow direction x. Yet both connecting members 351, 352 are arranged in the region of the curves 44 of the measuring tubes 4, where the measuring tubes 4 experience maximum bending. The contact points or contact areas between the connecting members 351, 352 and the measuring tubes 4 thus lie in a plane that is angled relative to a plane perpendicular to the flow direction x. Such an offset arrangement of the connecting members 351, 352, in particular in the region of the curves 44, can further improve the vibration behavior and thus the measurement results of the Coriolis mass flow meter 1. All in all, the configuration of the fixing elements 35 according to the invention can achieve a particularly advantageous balance between the increase in stiffness caused by the increase in internal pressure and the decrease in stiffness of the measuring tubes 4 caused by their flattening. As a result, the pressure dependence of the measurement of the mass flow and the density of the fluid medium performed by the Coriolis mass flow meter 1 is reduced significantly. A separate measurement of the pressure and mathematical compensation of the measured values is therefore no longer necessary, which reduces manufacturing and maintenance costs.

What is claimed is:

1. A Coriolis mass flow meter, comprising:
a housing with an inlet and an outlet for a fluid medium, which are arranged along a flow axis;
two measuring tubes configured to allow the fluid medium to flow through them in a flow direction and arranged between the inlet and the outlet and having a measuring tube circumference on their external surface;
a fixing element which connects the two measuring tubes in the region of the inlet and/or the outlet in such a manner that they are fixed in position relative to one another, wherein a resting area of the fixing element on the respective measuring tube is smaller in the flow direction than in the direction of the measuring tube circumference;
a vibration exciter configured to cause the measuring tubes to vibrate in a vibration direction; and
two vibration sensors for detection of the movements of the measuring tubes,
wherein the fixing element is connected to the two measuring tubes in such a manner that a part of the measuring tube circumference of each measuring tube is left free, wherein the fixing element includes a first connecting member and a second connecting member which are configured as separate components that are arranged on the measuring tubes at a distance from one another with respect to the flow direction, wherein the first connecting member and the second connecting member are each connected to both measuring tubes, and wherein each of the connecting members rests against the measuring tubes in such a manner that a part of the measuring tube circumference of each measuring tube remains free.

2. The Coriolis mass flow meter according to claim 1, wherein the fixing element is attached to the measuring tubes along less than two thirds of the measuring tube circumference.

3. The Coriolis mass flow meter according to claim 1, wherein the connecting members are configured and arranged so as to be movable relative to the housing in a direction perpendicular to both the vibration direction and the flow direction.

4. The Coriolis mass flow meter according to claim 1, wherein at least one of the connecting members is arranged in the region of curves of the measuring tubes located downstream of the inlet and/or upstream of the outlet in the flow direction.

5. The Coriolis mass flow meter according to claim 1, wherein at least one of the measuring tubes includes at least a section having an oval cross section, so that the measuring tube has a longer axis (a) and a shorter axis (b) perpendicular to the flow direction in this section.

6. The Coriolis mass flow meter according to claim 5, wherein the connecting members are attached to the measuring tube in the section having an oval cross section.

7. The Coriolis mass flow meter according to claim 1, wherein the fixing element is attached to the measuring tubes through soldering, welding or bonding.

* * * * *